United States Patent [19]

Morse

[11] 4,290,116

[45] Sep. 15, 1981

[54] METHOD AND APPARATUS FOR OPERATING A PRINTER

[75] Inventor: Timothy C. Morse, Salem, N.H.

[73] Assignee: Centronics Data Computer Corp., Hudson, N.H.

[21] Appl. No.: 40,866

[22] Filed: May 21, 1979

[51] Int. Cl.³ .......................... G06F 3/12; G06F 11/00
[52] U.S. Cl. ...................................... 364/900; 371/4; 371/57
[58] Field of Search ... 364/200 MS File, 900 MS File, 364/200, 900; 371/4, 57; 400/70, 74; 178/30

[56] References Cited

U.S. PATENT DOCUMENTS 3,959,776  5/1976  Morley ................................. 364/900
4,096,578  6/1978  Malkemes .......................... 364/900

Primary Examiner—Raulfe B. Zache
Attorney, Agent, or Firm—Weinstein & Sutton

[57] ABSTRACT

Method and apparatus for operating a printer to control acceptance of data from an external source and to execute the operations associated with printing. The electronics comprises a microprocessor based control system in which both the program steps and the data to be printed are stored in the microprocessor memory and wherein the microprocessor accepts incoming data and processes such data in accordance with foreground and background programs, respectively, and wherein the system is provided with interrupt capabilities for jumping from one program to the other upon the occurence of predetermined criteria.

A number of protective techniques and circuits are provided to prevent certain operations from being executed during power up or power down conditions.

23 Claims, 22 Drawing Figures

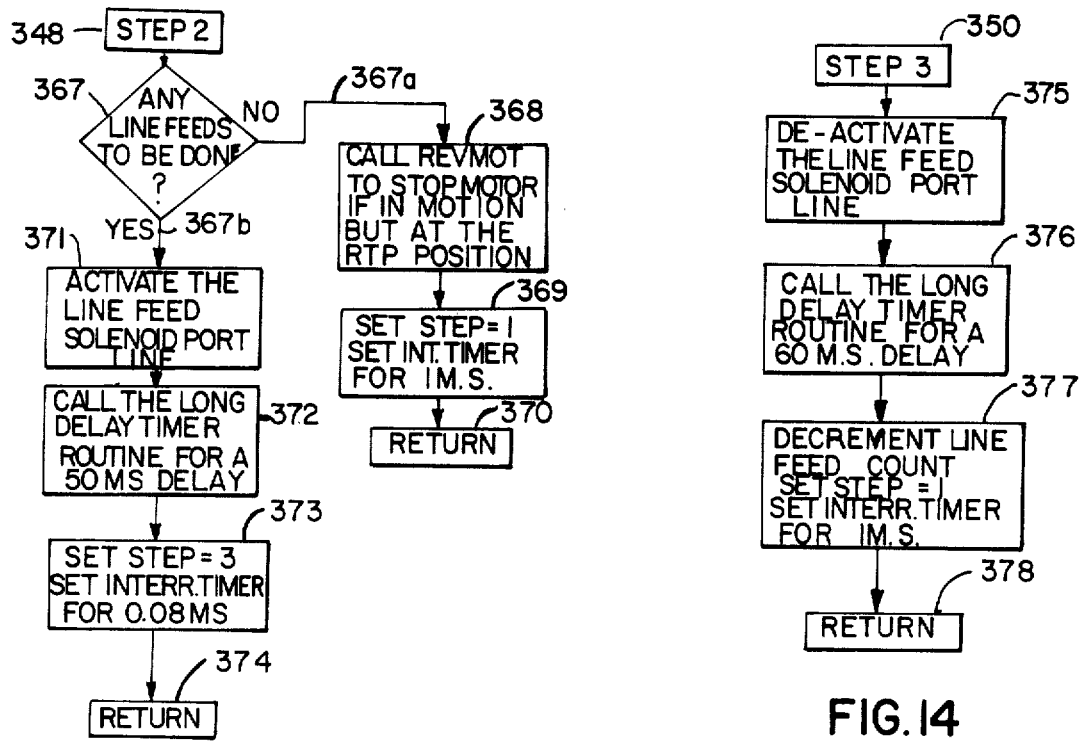
FIG.13
FIG.14
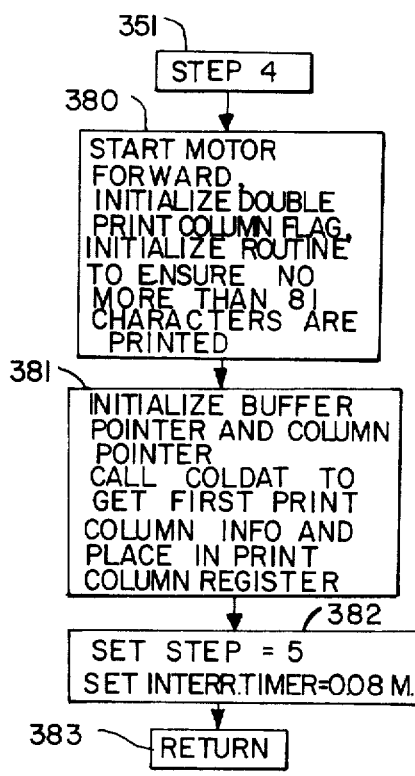
FIG.15
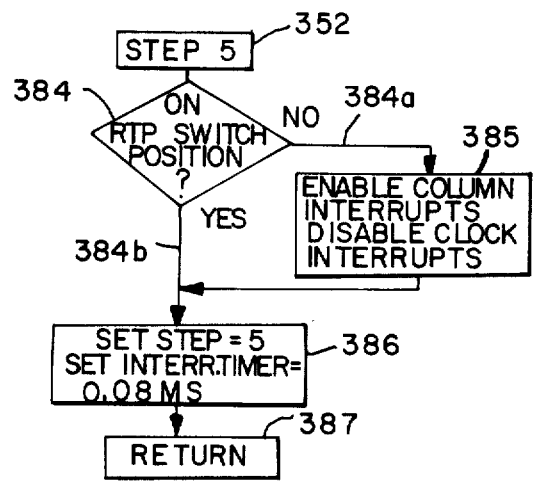
FIG.16

METHOD AND APPARATUS FOR OPERATING A PRINTER

BACKGROUND OF THE INVENTION

The present invention relates to printers and, more particularly, to printer control means in the form of microprocessor based circuitry for controlling all operations of the printer and providing flexibility not heretofore available through conventional printer control apparatus.

Printers find widespread use throughout commercial, industrial and military applications, as well as the home consumer market. The printers are typically interfaced with computers and/or a communications link for the purpose of printing the data being processed or being transmitted, as the case may be. Conventional printers are typically comprised of a register for receiving incoming data and printing the received data when the register is filled. Suitable hardwired logic of a fixed type routine is provided for performing the functions necessary for accepting data from the computer or communications link and, thereafter, printing the accepted data. Hardwired circuitry of this type is incapable of providing the flexibility desired, and, in many cases, even required of a printer in order to be capable of use through a wide variety of applications. In addition to providing such flexibility, it is also important to be able to do so at a practical cost.

BRIEF DESCRIPTION OF THE INVENTION

The present invention is characterized by providing a novel, highly flexible microprocessor based control system for printers and the like which is adapted to provide a high degree of flexibility at an extremely modest cost.

The present invention is comprised of a microprocessor unit which is in the form of an extremely small integrated circuit chip which contains all of the processor registers, the accumulator, the control circuitry, input and output buses, as well as arithmetic logic capability and sufficient memory for storing all incoming data, as well as all of the program steps of the foreground and background programs, including the main routines, as well as the subroutines thereof.

Interrupt capability is generously provided throughout the software routines for switching from one routine to the other. Protective devices are provided for assuring the clearing and/or settling of certain signal conditions to prevent the execution of certain computer functions as well as preventing the performance of the certain functions during power up or power down conditions. The inherent high operating speeds achieved by the microprocessor based printer control system relative to the mechanical speeds at which the printer mechanism operates, enable the performance of many steps, at electronic speeds, simultaneously with the performance of physical operations of the printer mechanism, which operates at mechanical speeds which are one or two orders of magnitude slower than the operating speed of the microprocessor.

OBJECTS OF THE INVENTION AND BRIEF DESCRIPTION OF THE FIGURES

It is, therefore, one object of the present invention to provide a microprocessor based control system for printers and the like which has a high degree of flexibility to adapt the printer control system to a wide variety of applications.

Still another object of the present invention is to provide a novel microprocessor based control system for printers and the like in which the system is capable of performing frequent jumps from data accepting phases of the program to printer execute phases of the program, yielding a system with still greater flexibility.

The above, as well as other objects of the present invention will become apparent when reading the accompanying description and drawings in which.

Figure 1:
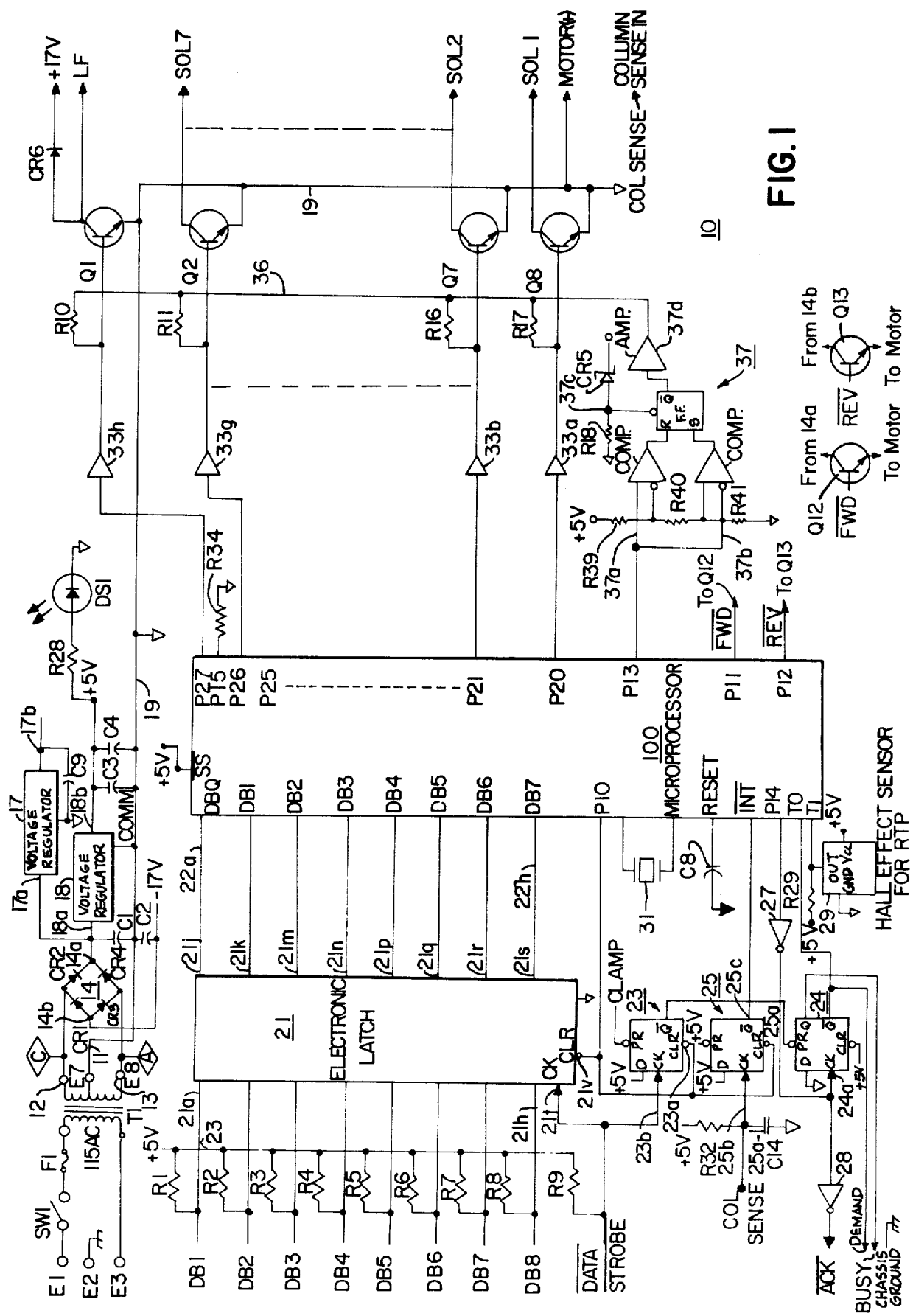
FIG. 1 shows a simplified schematic diagram of a printer control system designed in accordance with the principles of the present invention.
Figure 4:
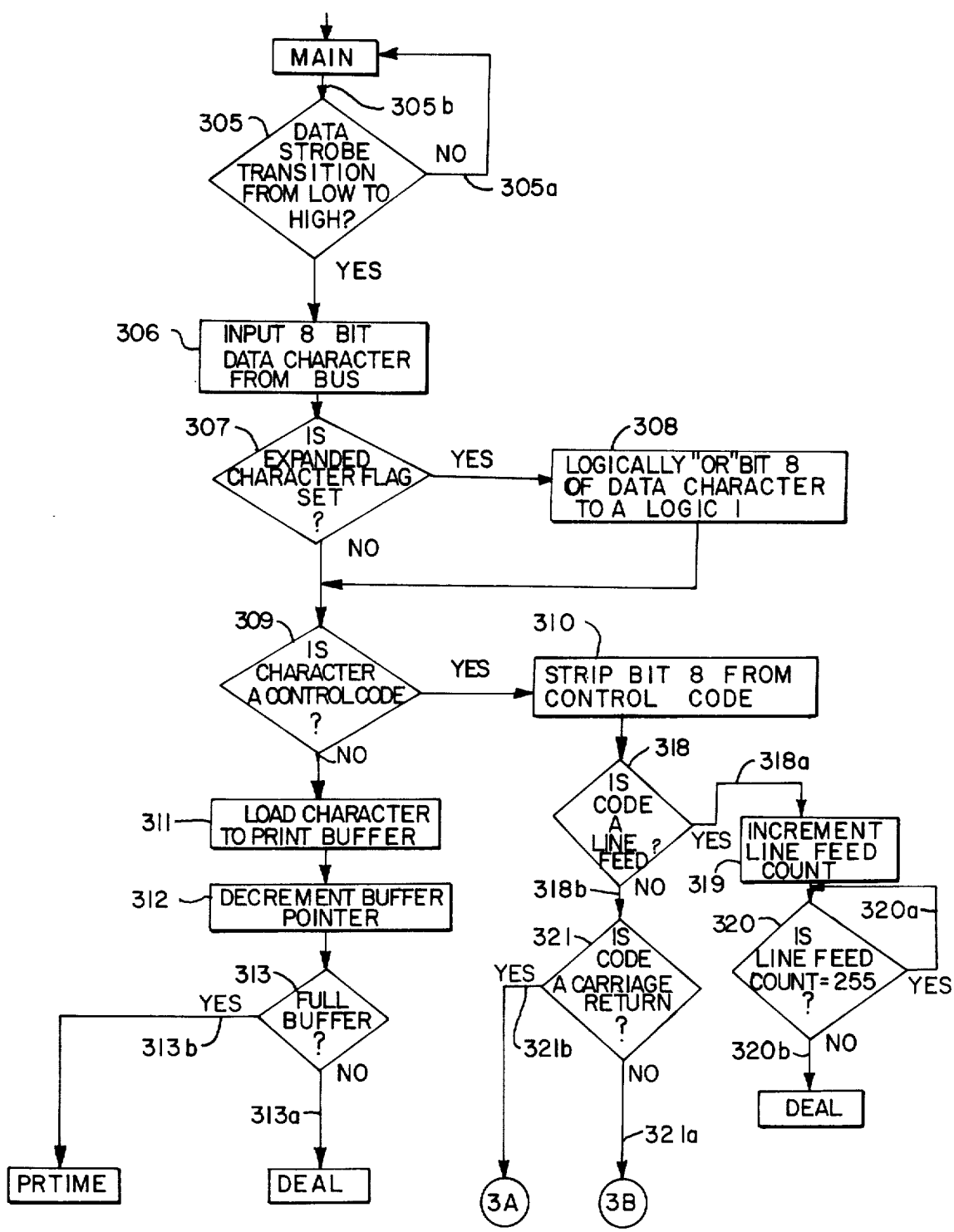
Figure 5:
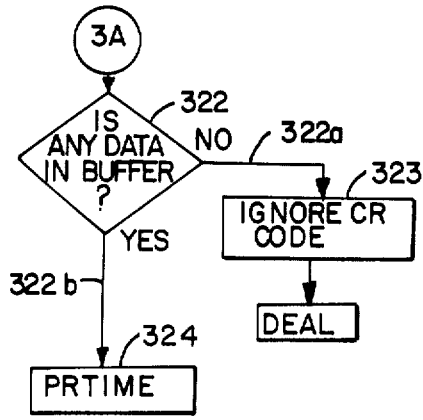
Figure 6:
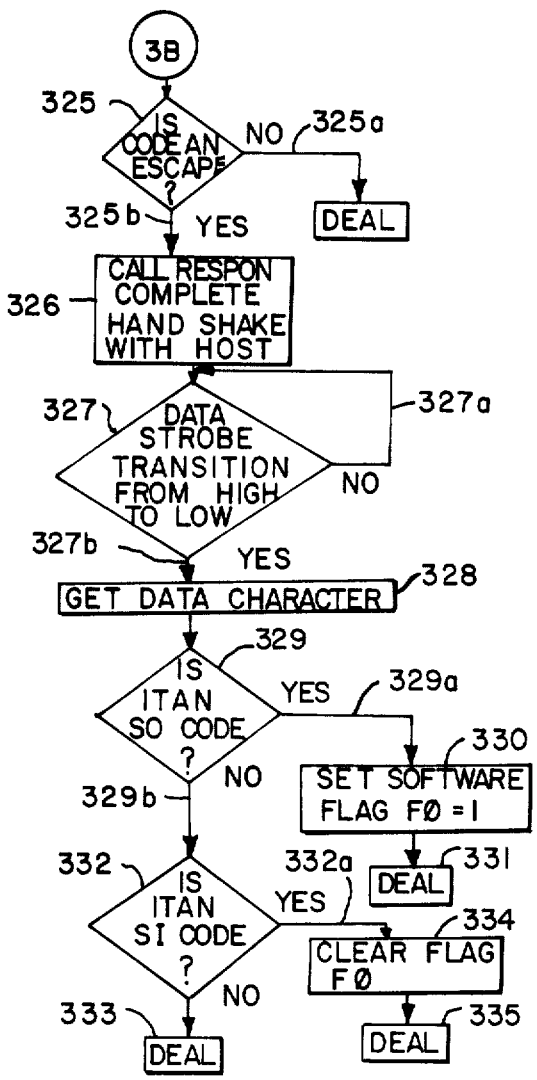

FIGS. 4, 5 and 6, taken together, are flow diagrams showing the main line routine of the printer control system of FIG. 1.

Figure 7:
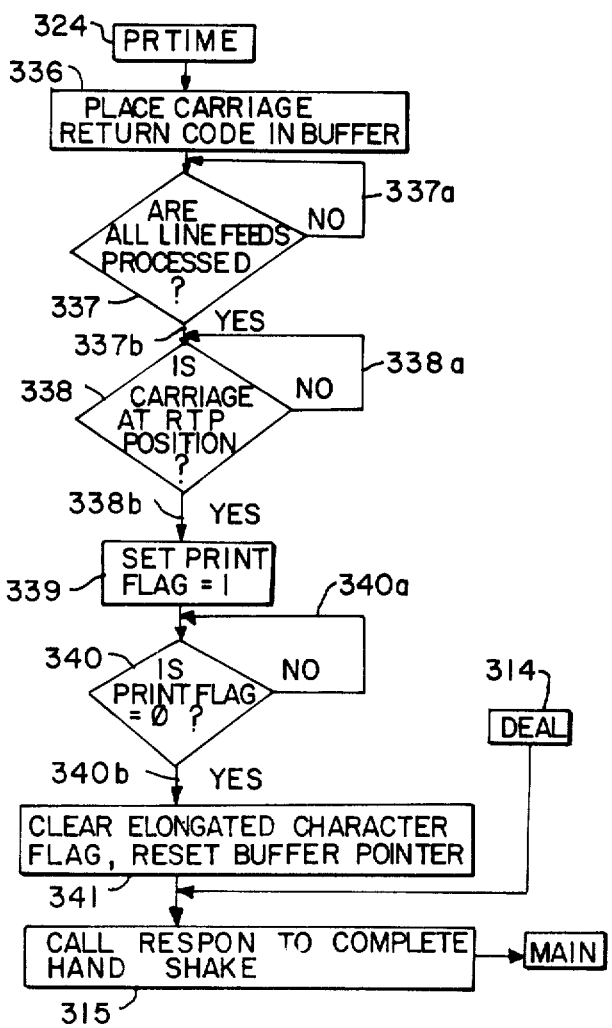
Figure 8:
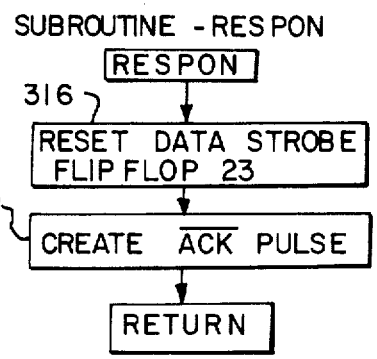

FIGS. 7 and 8 show flow diagrams of subroutines forming part of the main line routine.

Figure 9:
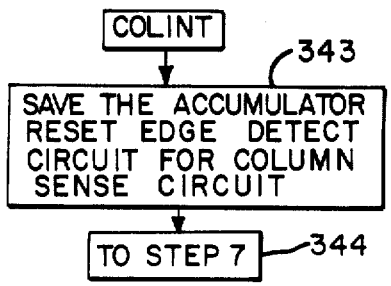

FIG. 9 shows a flow diagram of a column interrupt service routine.

Figure 10:
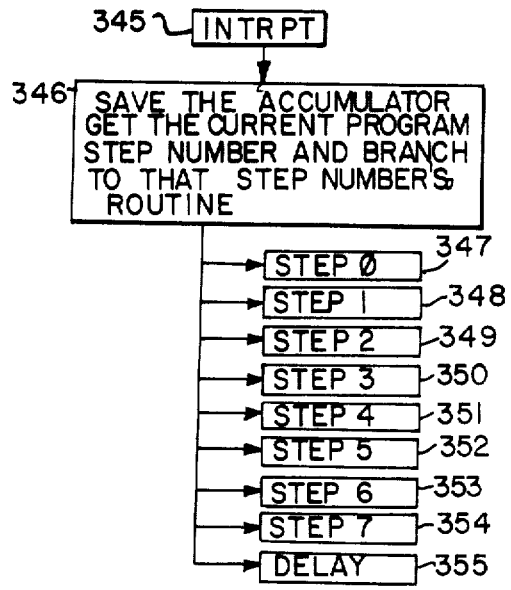

FIG. 10 shows a flow diagram of a timer interrupt service routine.

FIGS. 11-18 and 20 are flow diagrams showing the detailed routines of each step number under the timer interrupt service routine.

Figure 19:
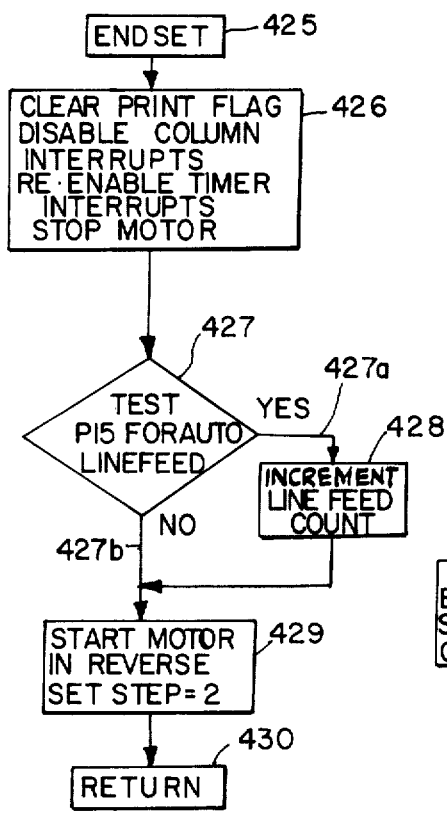

FIG. 19 shows a flow diagram of the end set routine.

Figure 21:
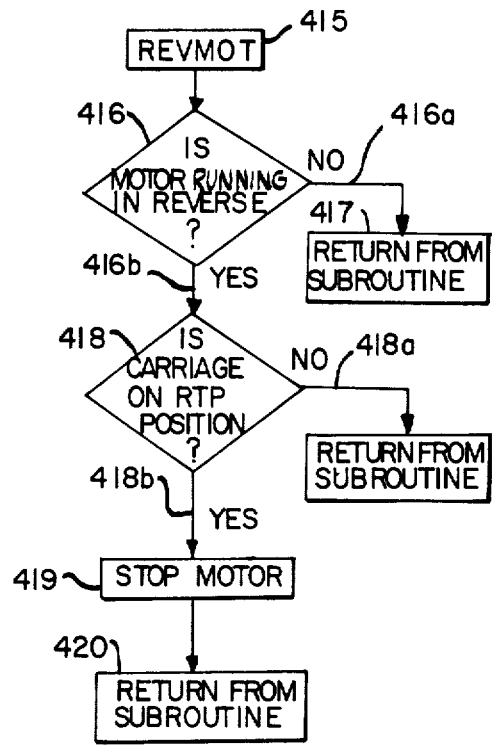

FIG. 21 is a flow diagram showing the motor control routine.

Figure 22:
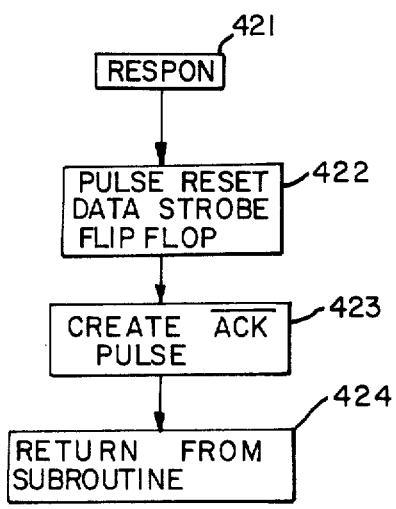

FIG. 22 is a flow diagram showing the respond routine.

DETAILED DESCRIPTION OF THE INVENTION

FIG. 1 shows a printer control system 10 combining the principles of the present invention and comprised of a microprocessor 100 which may, for example, be an Intel type 8049 microprocessor. The microprocessor and associated circuitry is powered by a 115 volt A.C. source coupled to transformer T1 through a switch SW1. An overcurrent protection fuse F1 is connected between the power source and the primary of transformer T1. The secondary of transformer T1 steps the voltage down to provide 12.6 volts A.C. at the secondary terminals 12 and 13 of the transformer relative to common terminal 11. Terminals 12 and 13 are connected across a first diode bridge 14.

Diode bridge 14 provides unregulated D.C. at its output terminals 14a and 14b. Positive terminal 14a is simultaneously coupled to the inputs 17a and 18a of voltage regulators 17 and 18, respectively. Voltage regulator 17 provides a regulated D.C. output of +12 voltage at terminal 17b. Voltage regulator 18 develops a voltage level of +5 volts at its output 18b. Capacitors C3, C4 are connected between output terminal 18b and common bus 19 to provide a highly regulated DC output. A larger or smaller number of capacitors may be employed, depending only upon the needs of the particular application. Terminal 18b is coupled through resistor R28 and light emitting element DS1 to ground reference. The light emitting element DS1 is adapted to emit light when system power is on.

The terminals 14a and 14b of diode bridge 14 provide +17 volts and −17 volts unregulated D.C. for respective application to the collectors of transistors Q12 and Q13 which serve to apply a voltage signal of the proper polarity to the bidirectional (DC) motor of the printer, which motor is utilized to move the print head relative to the print receiving medium provided in the printer. For purposes of simplification of the present invention, a description of the printer has been omitted herein. One printer which may use the printer control system of the present invention to great advantage is described, for example, in detail in copending applications Ser. Nos. 40,899; 40,898; and 40,911, all filed May 21, 1979, and assigned to the assignee of the present invention.

For purposes of the present invention, it is sufficient to understand that the printer is provided with a stationary platen and a movable carriage assembly upon which the print head is mounted. The print head is of the dot matrix impact type, capable of printing a dot column pattern upon the print receiving medium as the carriage moves linearly along the paper, signals being applied to the solenoids of the print head to selectively activate the print wires for printing dot column patterns. Typically, seven adjacent dot column patterns collectively define a character arranged within a seven row by seven column dot matrix wherein a total of 49 dot positions within the dot matrix are selectively chosen to define alphabetic characters, numeric characters, punctuation marks, and other symbols.

As will be more fully described hereinbelow, the microprocessor is capable of providing either a forward ($\overline{FWD}$) or reverse ($\overline{REV}$) signal, which signals are mutually exclusive and are employed to control the application of a D.C. voltage of the appropriate polarity to the carriage driving motor utilized for moving the print head carriage relative to the print receiving medium.

An electronic latch 21 is provided for receiving data which may represent either a character or a control code, from a remote device which may, for example, be the output of a computer or communications device. The latch 21 is provided with eight input terminals 21a–21h, some of which have been omitted for purposes of simplicity. Similarly, eight output terminals 21j–21s are arranged to couple the data word at the output terminals through conductors 22a–22h to respective inputs DB0–DB7, forming the data bus inputs of microprocessor 100. The input terminals DB1–DB8 coupled to the remote source of data are all normally maintained at a +5 volt D.C. level coupled to each incoming line through a common line 23 and a resistor R1–R8, each respectively coupled between its associated input line and common line 23. The remote source of data, in addition to applying a data word to input terminals DB1–DB8, provides a strobe pulse (DATA STROBE), which signal is utilized to strobe the word at input lines DB1–DB8 into the latch circuit 21. Thus, when a low level DATA STROBE signal is applied to the clock input 21t of latch 21, the eight bit data word appearing at the input terminals 21a–21h is transferred and temporarily stored at the output terminals 21j–21s of latch 21, in readiness for subsequent transfer into lines DB0–DB7 of the microprocessor 100 data bus.

The DATA STROBE signal is simultaneously applied to the clock input of an edge sensitive bistable flip-flop 23 whose Q output is set upon occurrence of the edge of the DATA STROBE pulse to preset bistable flip-flop 24, causing its Q output to go low, which condition is sensed at the appropriate time by the T0 input terminal of microprocessor 100, as will be more fully described.

When data is properly transferred to the microprocessor data bus comprised of inputs DB0 through DB7, a signal is developed at microprocessor output terminal P10 which is simultaneously applied to the clear input 21v of latch 21; the clear input 23a of bistable flip-flop 23 and the clear input 25a of another edge sensitive bistable flip-flop 25 which is utilized for a purpose to be more fully described hereinbelow.

The P14 output terminal of microprocessor 100 is coupled through an inverter 27 to the clock input 24a of bistable flip-flop 24. A second inverter circuit 28 inverts the signal appearing at the output of inverter 27 for developing an acknowledge signal ($\overline{ACK}$) for acknowledging the receipt of certain data from the remote data source, as will be more fully described. The setting of bistable flip-flop 24 by the signal appearing at the output P14 of microprocessor 100 is, in one polarity, utilized to provide the acknowledge signal, and when causing the setting of bistable flip-flop 24 to provide a busy signal (BUSY) indicative of the fact that the printer is performing functions which prohibit it from accepting either data or command codes from the remote data source.

The printer is provided with a Hall effect sensor 29 adapted to apply a output signal to input T1 of microprocessor 100 when the print head returns to the left-hand margin of the print receiving medium. The state of the output of Hall effect sensor 29 is examined at predetermined points within the routines of the microprocessor 100 as will be more fully described.

A crystal 31 forms part of the crystal oscillator circuit for microprocessor 100 and is selected to cause the crystal oscillator circuit to operate at a frequency of 6 megaHertz. Internal divider circuitry provided as an integral part of microprocessor 100 divides down the output of the crystal oscillator to provide an internal clock for generating pulses at 0.08 millisecond intervals. These pulses are utilized in conjunction with registers internal to the microprocessor 100 for providing timer functions as will be more fully described.

Capacitor C8 functions to delay reset of the microprocessor in the following manner:

When power is turned on by closing switch SW1, the highly regulated +5 volt DC level appearing at the output 18a of voltage regulator 18 is applied to the microprocessor 100. Since some time is required for these voltage levels to reach steady state during the power up condition, it is highly advantageous to prevent microprocessor 100 from initiating operation until all voltage levels have settled to values satisfactory for error-free operation of microprocessor 100. As soon as the power is turned on, capacitor C8, which is normally discharged, requires a few milliseconds to charge toward +5 volts, which delay interval is of a length sufficient to assure that all of the output levels of the power supply for the printer control system have settled.

The microprocessor 100 is provided with two groups of input/output ports utilized for executing printer functions. The first input/output port group is comprised of the microprocessor terminals P20 through P27 while the second group of input/output ports is comprised of the terminals P10 through P17. The output terminals P20 through P26 are each connected through an associated inverter 33a through 33g, some of which have been omitted for purposes of simplicity, each inverter output being coupled in turn to the base electrode of an associated transistor Q8 through Q2 some of which have also been omitted for purposes of simplicity. The emitters of transistors Q8 through Q2 are connected to ground while the collectors of transistors Q8 through Q2 are adapted for connection to the input terminals of the seven (7) solenoid windings (SOL 1 through SOL 7) of the print head assembly for energizing the solenoids to cause activation of the print wires.

The output terminal P27 is coupled through an inverter 33h to the base of transistor Q1 whose emitter is coupled to ground through common bus 19 and whose collector is coupled to the activating device for performing a line feed (LF) operation. The printer described in the aforementioned application Ser. No. 40,911 filed May 21, 1979 employs a line feed actuating device which is solenoid actuated to advance the web feeding means through incremental line feeds.

The base electrode of each of the transistors Q1 through Q8 are all respectively connected to a common bus 36 through resistors R10 through R17, respectively. Common bus 36 is coupled to the output of a timer circuit 37 of the "555" type, whose timer input lines 37a and 37b are connected in common to output terminal P13 of microprocessor 100 and whose reset input line 37c is coupled to the common terminal between resistor R18 and Zener diode CR5. The opposite terminal of Zener diode CR5 is coupled to the +12 volt DC level appearing at output 17b of voltage regulator 17. The timer circuit 37 is designed to prevent the firing of the printhead solenoids by preventing transistors Q2–Q8 from conducting until either a low level input is simultaneously applied to the timer input terminals 37a and 37b or until a signal of the appropriate voltage level appears at the reset input line 37c. Thus, in the event that there is either a power up or power down (i.e., "brownout") condition causing the voltage level at the common terminal between resistor R18 and Zener diode CR5 to be a level insufficient to permit operation of the printer, a transistor amplifier 37d forming part of the timer circuit 37 and which has a large current carrying capability, clamps the common bus 36 to a low level preventing all of the transistors Q2–Q8 from firing and further preventing the line feed actuating transistor Q1 from conducting, thereby providing an extremely advantageous safety feature which prevents the erroneous firing of the line feed and print head solenoid actuating transistors Q1–Q8 until the power supply circuits have settled (i.e., until power-up or power-down conditions which may, for example, be due to a brownout have been cleared).

Figure 2:
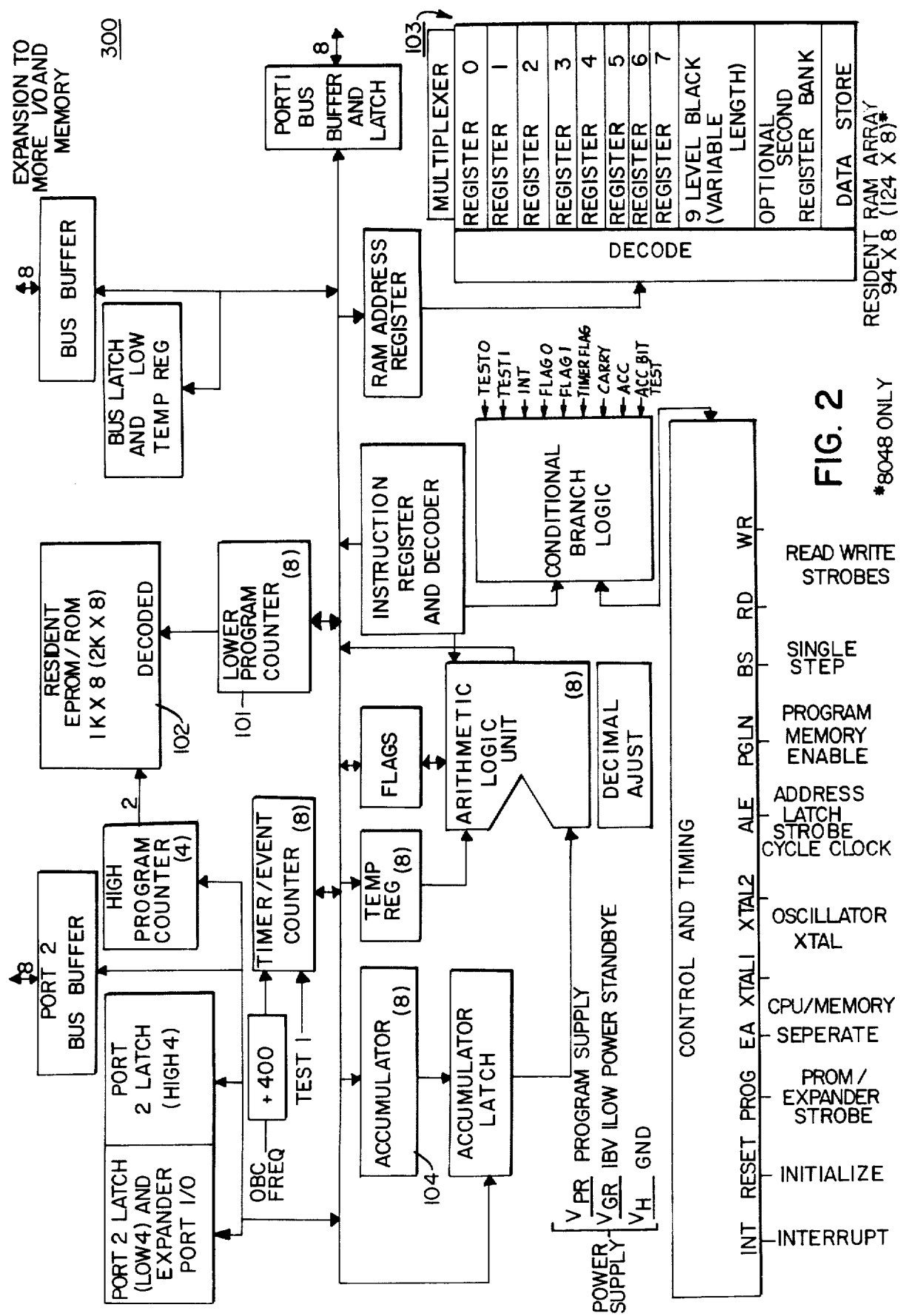
FIG. 2 shows a detailed block diagram of the microprocessor employed in the printer control system of FIG. 1.

FIG. 2 shows a simplified block diagram of the basic building blocks of microprocessor 100 and will be referred to during the description of the program routine, the particular subcomponents of the microprocessor 100 being substantially conventional.

The first computer software routine is comprised of the power-up operation which has basically been described as set forth hereinabove, wherein upon closure of switch SW1, the various power supply levels are established and, after a suitable safe time delay, capacitor C8 is charged to a sufficient level to apply a signal to the reset input (RESET) of microprocessor 100 which functions to set the microprocessor program counter 101 to a zero count. The microprocessor 100 then calls out the location in the Read Only Memory (ROM) 102 whose address is represented by the zero count in the program counter 101. The contents of that memory location initiates the initialization program routine which at stage 301 (FIG. 3) initializes the buffer pointers and the output port latches of microprocessor 100. At this time, the buffer pointers in Random Access Memory (RAM) 103 are set, which pointers identify the locations in RAM 103 which are to contain the number of characters capable of being printed on a line of the print receiving medium. Although the printer may be adapted to a wide range of line lengths, examples set forth herein will be limited to an eighty (80) column printer, i.e. a printer capable of printing eighty (80) characters per line at a spacing of ten (10) characters per inch thus being capable of printing eighty (80) characters along a line of eight (8) inch length.

The output port latches are initialized to prevent the occurrence of erroneous and undesirable printer operations. For example, the output port latches for microprocessor terminals P20 through P26 are all set low to prevent any of the print head activating transistors from being erroneously rendered conductive. Similarly, the output of the port latch for terminal P27 is set low to prevent the erroneous performance of a line feed operation until all initialization steps are completed.

After these initialization steps are performed, the program advances to step 302 which provides a delay of 100 milliseconds to permit the system hardware to stabilize. Upon completion of the 100 millisecond delay, the program advances to step 303 wherein selected software flags are cleared, the line feed count is set to 0 and the acknowledge (ACK) line is pulsed to remove the BUSY condition and raise the DEMAND condition. The software flags comprise: the expanded character set flag which is normally set to logic 0 prior to receiving any data; the print flag which is normally set to logical 0 before receiving any data; etc.

The line feed count, which is stored in a dedicated address location in RAM 103 is cleared to zero prior to receipt of any data, the line feed count representing the number of line feed operations received from the remote source is adapted to be stored in the address location in RAM 103 dedicated thereto, at least until the line feed (or line feeds) can be performed. In the event that a line feed count greater than zero is stored therein and additional line feed codes are received, the line feed count is incremented. Each time a line feed operation is performed, the line feed count is decremented, as will be described hereinbelow in connection with the routine employed for performing line feeds.

Upon completion of these steps, the microprocessor applies a pulse at its output terminal P14 which passes through inverter 27 to set bistable flip-flop 24 so as to remove the busy condition and raise the demand condition at the Q and $\overline{Q}$ outputs, respectively of bistable flip-flop 24.

Thereafter, stage 304 initializes a timer interrupt count to 1 millisecond and activates the timer interrupt. The interrupt timer is comprised of a dedicated address in RAM 103 which is settable to a binary number representing a predetermined count in order to obtain the appropriate time delay depending upon the particular operation or operations being performed. For example, for clock pulses spaced at eighty (80) microsecond intervals, a count of 12 is set into the timer interrupt count so that when 12 ticks (i.e., twelve pulses spaced at eighty (80) microsecond intervals) have occurred the interrupt timer is counted down to 0, and approximately 1 millisecond has expired.

Upon completion of stage 304, the main line routine of the FOREGROUND program is entered. The MAIN LINE routine is shown in FIG. 4 at which time the microprocessor 100 examines the DATA STROBE transition. As was mentioned hereinabove, the DATA STROBE pulse from the remote data source is applied to the clock input 23b of edge sensitive bistable flip-flop 23. Upon sensing the appropriate edge of the DATA STROBE pulse, the $\overline{Q}$ output undergoes a binary transition applying this condition to the preset input of bistable flip-flop 24 to drive its Q output high. The DATA STROBE transition is examined at input terminal T0. In the event that DATA STROBE has not gone from low to high, the routine loops at this time back from 305a into 305b. As soon as the low to high transition is sensed at input T0, the program advances to stage 306 where the eight-bit data word appearing at the outputs 21j through 21s of electronic latch 21 is loaded into the data input bus 105 of microprocessor 100.

At 307, the expanded character flag is examined to determine whether it has been set. In the event that this is the first data word being received, the expanded character flag would have been reset. However, in the event that the expanded character flag is set, the program branches at 308 to logically OR data-bit 8 (DB8) of the data character to a logic 1. In other words, regardless of the state of data-bit 8 (DB8), it is forced to a logical ONE state.

The expanded character flag is set by receipt of a control code requesting the printing of expanded characters. In the event that the data word received contains a logic ONE in the bit-8 position, this is an alternative method for controlling the printing of expanded character without transmitting an expanded character code. The program then advances to stage 309 and the inputted data word is examined to determine whether it is a control code. In the event that the data word is a control code, bit 8 (DB8) is stripped from the control code word since control codes consist of only seven usable binary bits. In the event that the character is not a control code, the program branches to step 311 causing the character code, which, since it is not a control code, is, therefore, a data word, to be loaded into the print buffer which is the highest numbered address location in RAM 103 as determined by the buffer pointers defining the region in RAM 103 allocated to storing the eighty (80) character codes. As soon as the character code is loaded in the highest address in memory which is defined as the "print buffer", the buffer pointer is decremented by one count. As each word is received and examined to determine whether it is a character or control code, it is loaded in the print buffer, if a character code, and the buffer pointer is decremented down to the lower valued address at which time, at program step 313 the buffer pointer is examined to determine whether the buffer is full or not. In the event that the buffer is not full, the program branches at 313a to a portion of the program routine shown in FIG. 7 identified by the mnemonic DEAL shown at 314 wherein a CALL RESPONSE is generated at stage 315 to complete the "handshake" between the remote data source and the printer control electronics. This causes the subroutine of FIG. 8 to be activated in which the microprocessor 100 develops a pulse at output P10 to reset data strobe flip-flop 23 as shown at stage 316 of FIG. 8; the acknowledge pulse (ACK) is then developed at stage 317 by creating a pulse at output P14 of microprocessor 100 and the program returns to step 303 of the initialization phase of the program shown in FIG. 3.

In the event that the buffer is full when examined, the program branches at 313b and enters into the print routine shown in FIG. 7 and to be more fully described after completion of the description of the MAIN LINE routine shown in FIG. 4.

Returning to step 310 of the main line routine, after bit 8 is stripped from the control code, the control code is examined at 318 to determine whether it is a line feed code. In the event that it is a line feed code, the program branches at 318a to increment the line feed count in the aforementioned dedicated address location in RAM 103. After the line feed is incremented at 319, the count is examined at 320 to determine whether it has a maximum value of 255 counts. In the event that the count has already reached 255, the program enters into a little loop at 320a where it continues to recirculate in this condition until a line feed operation is performed, which causes the line feed count to be decremented to a count of less than 255 at which time the program branches at 320b to enter into the DEAL step of the subroutine of FIG. 7 and the RESPON (response) subroutine of FIG. 8.

Returning to the program step 318 at which time the control code is examined, in the event that the control code is not a line feed, the program branches at 318b and the control code is examined to determine whether it is a carriage return. In the event that it is not a carriage return, program stage 321 branches at 321a to enter into the program sub-routine shown in FIG. 6. In the event that the code is a carriage return, the program branches at 321b to enter into the program routine of FIG. 5.

Considering FIG. 5, and assuming that the code being examined is a carriage return code, the program branches at 321b of FIG. 4 and, at 322, examines the data buffer to see if it contains any data. In the event that the data buffer contains no data, the program branches at 322a and ignores the carriage return code at 323 as being an erroneous command since a carriage return code should follow the transmission of character code data. In the event that the data buffer contains data, the program branches a 322b to the print routine shown in FIG. 7.

Turning to a consideration of FIGS. 4 and 6, in the event that the code is not a carriage return code, the examination at stage 321 (FIG. 4) branches at 321a and enters into stage 325 (FIG. 6) where the code is examined to determine whether it is an escape code. An escape code is a code word in ASCII, and is transmitted prior to an elongated character enable code, the latter code (ASCII) representing the alphabetic letters SI, when it is desired to set the printer for printing elongated characters or an elongated character disable code, the latter code (in ASCII) representing the alphabetic letters SO, when it is desired to remove or terminate the elongated character format.

In the event that the code is not an escape code, the program branches at 325a and jumps to the DEAL routine at 314 shown in FIG. 7.

If the code is an escape code, the program branches at 325b to enter stage 326 which calls for the respond (RESPON) subroutine described hereinabove in connection with FIG. 8. This causes an acknowledge (ACK) pulse to be transmitted to the data source acknowledging that the escape code has been received and awaiting the next code immediately following it which should either be the ASCII code word SI to set elongated characters or the ASCII code word SO to remove the elongated character format. The acknowledge pulse is accepted by the data source which waits for receipt of the acknowledge pulse before transmitting either the SI or the SO ASCII code.

The routine moves to stage 327 to ascertain whether a DATA STROBE transition from high to low has occurred. This transition or pulse edge developed by the data source, is recognized by the microprocessor 100 as an indication that the SI or SO ASCII code has been applied to the input terminals 21a through 21h of the electronic latch 21 shown in FIG. 1. In the event that the transition has not yet occurred, the branch 327a continues to loop around awaiting the occurrence. Upon the high to low transition, which is sensed at input TO of microprocessor 100, in the same manner as was previously described in connection with bistable flip-flops 23 and 24, the program branches at 327b wherein the character code which has been transferred to the output terminals 21j through 21s of electronic latch 21 is loaded into the microprocessor 100 at its input terminals DB0 through DB7.

The code, after being loaded in at 328, is examined at 329. If the code is an SO code, the program branches at 329a and at 330 the software flag FO is set to logic 1 and the program jumps from stage 331 to the DEAL stage 314 shown in FIG. 7.

In the event that the code is not an SO code, the program jumps at 329b to 332 where the code is examined to determine if it is a SI code. In the event that the code is not an SI, the program returns to the DEAL stage 314 shown in FIG. 7 at 333. In the event that the code is an SI code, the program branches at 332a to enter stage 334 which clears the software flag FO (i.e., sets the flag to logical 0) and at 335 returns to the program step 314 of FIG. 7.

Figure 3:
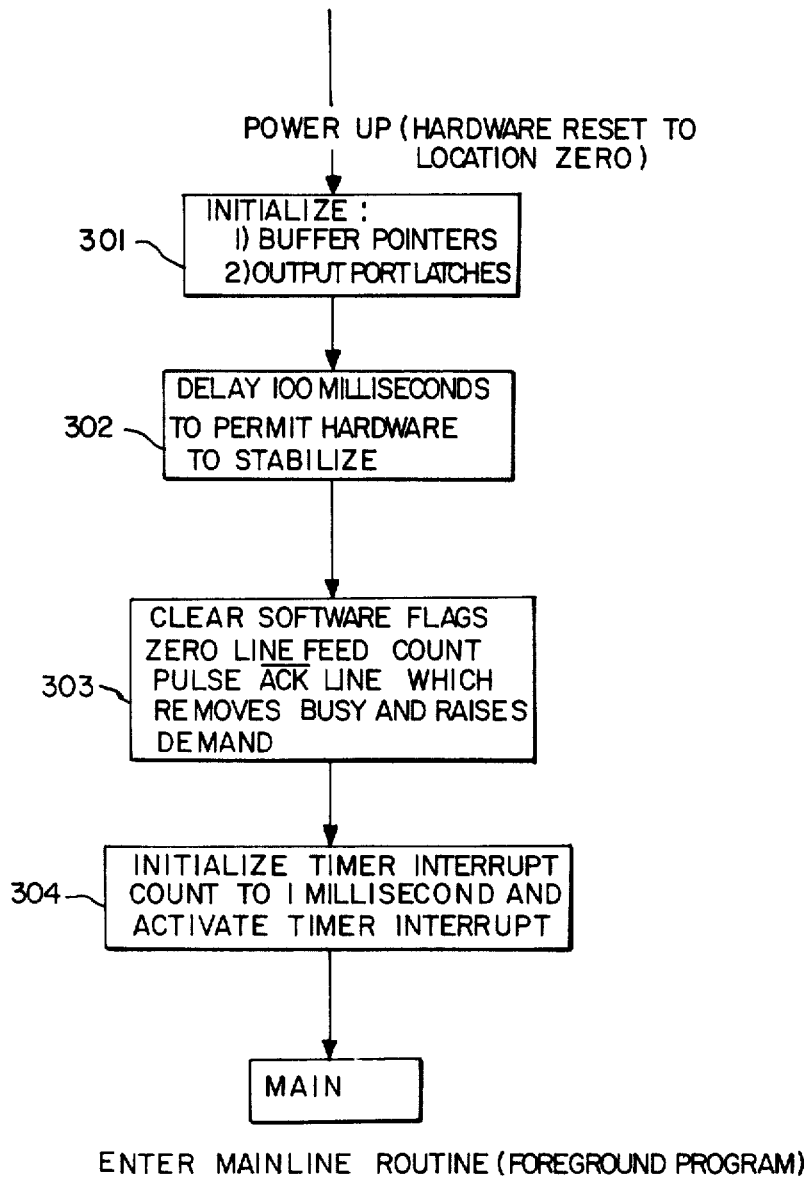
FIG. 3 shows a flow diagram of the initialization steps of the control system of FIG. 1.

FIG. 7 shows the print routine which is entered into from program step 324 shown in FIG. 3. Under these circumstances, the buffer in RAM 103 contains data and a carriage return code follows the transmitted data indicating that all operations are in readiness for printing. The print routine is initiated at 336 wherein the carriage return code is placed in the eighty-first (81st) storage position in RAM allocated to the line of characters to be printed (i.e., the PRINT BUFFER). Thereafter, the program examines the dedicated address in memory which contains a count representing unprocessed line feeds. In the event that all line feeds are not processed, the program branches into a small loop at 337 at which time all line feeds are processed. After all of the line feeds have been processed, the program branches at 337b to examine the position of the printer carriage at 338. This is accomplished by examining the output level of the Hall effect sensor 29 shown in FIG. 1 by determining the signal level at the microprocessor input terminal T1. In the event that the carriage is not returned to the ready-to-print (RTP) position, which is the position which it occupies at the left-hand margin of the print receiving medium, the program enters into a small recirculating loop at 338a awaiting return of the carriage to to the RTP position. As soon as the carriage arrives at the RTP position, the program branches at 338b and enters into step 339 at which time the print flag is set equal to ONE which serves to permit the microprocessor 100 to "remember" that the print routine is being performed. At 340, the print flag is examined and a small recirculating loop is entered into at 340a which continues recirculation until the print flag is set to 0, during which time the print routine is performed.

As soon as the print flag goes to logic 0, the program branches at 340b to enter stage 341 which causes the elongated character flag and the buffer pointer to be reset. The resetting of the elongated character flag is undertaken due to the fact that printing has been completed. The resetting of the buffer pointer is due to the fact that the character codes of each buffer location have been read out, decoded and printing has occurred.

After the elongated character flag is reset and the buffer pointer is reset, the program steps to stage 315 previously described, to complete the "handshake" operation which advises the remote data source that the last line has completed printing and the printer is now ready to receive coded information representative of the next line to be printed.

With respect to the examination of the print flag at step 340 of the program routine shown in FIG. 7, it should be understood that a jump from the BACKGROUND to the FOREGROUND programs, and vice versa, is accomplished by the setting of a interrupt timer which upon timing out, causes the program presently in process to be temporarily terminated in favor of jumping to the other program. This is precisely what is occurring at program step 340.

The printer has two interrupt service routines shown in FIGS. 9 and 10, respectively. FIG. 9 shows the column interrupt (COLINT) service routine which is utilized to assure accurate registration of the dot column patterns printed by the dot matrix print head of the printer as is described in detail in copending application Ser. No. 40,898 filed May 21, 1979, in which the carriage assembly described therein is provided with means for generating timing pulses in the form of a rotatable element having permanent magnet members arranged around the periphery of the rotatable element and having a Hall effect sensor element adapted to sense the magnetic fields developed by the permanent magnet members as these magnetic fields move past the Hall effect sensor element. The Hall effect sensor element is thus adapted to develop timing pulses at a predetermined rate, which pulses are identified by the mnemonic COL SENSE, the signal COL SENSE being applied at terminal 25a-1 for coupling to clock input 25b of bistable flip-flop 25 shown in FIG. 1 of the present application. The bistable flip-flop 25 is an edge sensitive flip-flop whose Q output 25c is coupled to the interrupt (INT) input of microprocessor 100. Upon entry into the column interrupt (COLINT) service routine, the contents of the microprocessor accumulator 108 are stored in a predetermined location in RAM 103. The edge detector bistable flip-flop 25 is reset through a pulse appearing at the output P10 of the microprocessor 100 which pulse is applied to the clear input 25a of bistable flip-flop 25. Thereafter, the program jumps from step 343 to STEP 7 of the Timer Interrupt service routine shown in FIG. 10.

The Timer Interrupt service routine of FIG. 10 is entered whenever an interrupt condition occurs. The generation of an interrupt condition, as described hereinabove, occurs when the interrupt timer times out to automatically initiate an interrupt operation thus entering step 345 of the Timer Interrupt service routine. Entry into the Timer Interrupt service routine causes advancement to step 346 at which time the contents of the accumulator is stored in a dedicated location in RAM 103; the current program step number in the program counter is obtained and a branch step is made to that step number in the Timer Interrupt service routine comprised of steps 347 through 355 which consist of steps 0 through 7 and a delay step, respectively.

As was described hereinabove, the contents of the accumulator 104 (FIG. 2) are transferred to an appropriate dedicated location in RAM 103. The present step in the program counter 101 is examined and the branch performed jumps to that step 347 through 355 of the timer interrupt service routine. The STEPS 0 through 7 and DELAY are comprised of dedicated locations in ROM which constitute the first step for entering into each of these subroutines.

Figure 11:
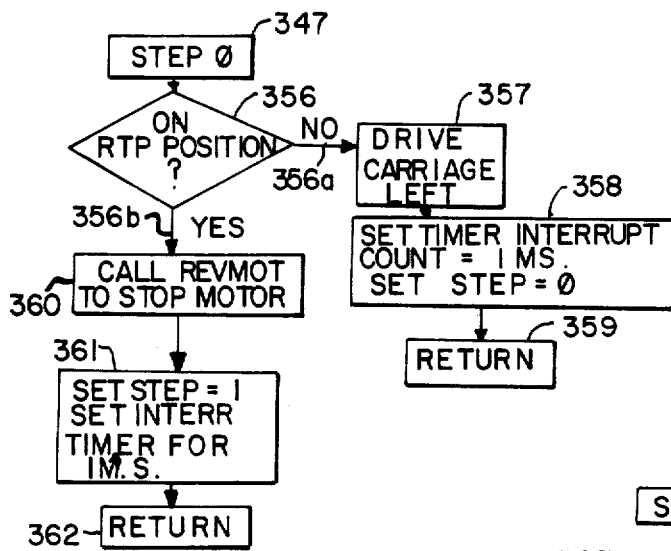

FIG. 11 shows the STEP 0 routine. When the program counter contains the address for STEP 0, the STEP 0 subroutine is initiated and at step 356 the microprocessor 100 examines the state of the Hall effect sensor 29 coupled to its input terminal T1 to determine whether the printer carriage assembly has reached the RTP position (i.e. has moved all the way to the left-hand margin of the printer). In the event that the carriage is not stepped to the RTP position, the program branches at 356a to step 357 which develops a pulse to drive the printer carriage assembly toward the left by development of an output signal which is transferred to the carriage assembly motor drive means through output terminal P12 of the microprocessor 100 for moving the carriage assembly to the left (i.e. in the reverse direction). As the carriage is moving in the performance of the carriage return operation, the program routine advances to step 358 which sets the timer interrupt count to 1 millisecond and sets the program counter to the STEP 0 count. This causes the program at step 359 to return to the STEP 0 address which is accomplished by examining the contents of the program counter which has just previously been set to the address at which STEP 0 is stored causing the program to return to step 347, the first step in the subroutine of FIG. 11. Thus, the microprocessor 100 temporarily leaves the BACKGROUND or "execute" program and returns to the FOREGROUND or "data collection" program to determine whether the remote data source is transmitting any data or control codes or to determine whether data already received requires any handling. As soon as the timer interrupt count times out after 1 millisecond, the FOREGROUND program is interrupted causing microprocessor 100 to jump to the BACKGROUND program and again: save the contents of the accumulator; determine the current STEP number in the program counter; and move to that step. In the present instance, the program agains returns to STEP 0 and again examines sensor 29 to determine whether the carriage assembly has returned to the ready-to-print (RTP) position. Obviously, in the case where the carriage is not returned to the ready-to-print position, the program will continue to repeat itself through steps 357 through 359. It should be understood that a 1 millisecond time period is sufficiently brief as to assure that no harm will come to the carriage even assuming that one of the 1 millisecond delay periods was set when the carriage was a small fraction of an inch away from the left-hand margin and moving rapidly toward the left-hand margin. Successive 1 millisecond delay intervals are sufficiently close to one another to prevent the carriage from impacting against the left-hand margin to prevent the carriage assembly from being damaged. In addition, it is also advantaneous to provide a resilient bumper along the frame of the printer immediately adjacent to the carriage and adapted to be impacted by the carriage, the resilient rubber-like bumper serving to absorb any impact of the carriage against the printer frame when the carriage reaches the left-hand margin.

Assuming that the ready-to-print (RTP) position has now been sensed by microprocessor 100, the program branches at 356b to advance to step 360 which serves to remove the reverse ($\overline{REV}$) signal applied to the printer carriage drive motor. This is accomplished by jumping to the reverse motor subroutine of FIG. 21, to be more fully described.

Thereafter, the subroutine of FIG. 11 advances to step 361 which: sets the address for STEP 1; sets the interrupt timer for 1 millisecond and then advances to step 362 to return to the FOREGROUND program. When the interrupt timer times out after 1 millisecond, the interrupt routine is again reentered at step 345 of FIG. 10 and since the program counter has been stepped to the address for step 1, step 1 is then entered into as shown at 348 in FIG. 10 and FIG. 12.

Figure 12:
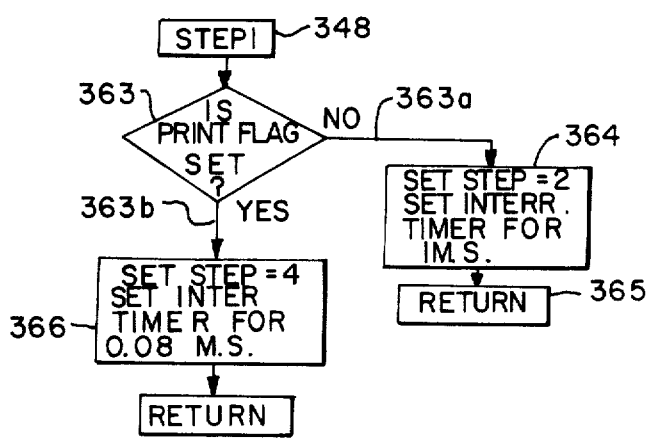

Considering the STEP 1 routine of FIG. 12, this subroutine advances to stage 363 which examines the print flag to determine whether the print flag has been set. As can be seen from FIG. 7, the print flag is set to logic 1 during the print routine. However, in the event that the print flag has not been set, the program branches at 363a to advance to step 364 which sets the program counter to step 2 and sets the interrupt timer for 1 millisecond. As was described hereinabove, the microprocessor can jump to the foreground program during this time. After 1 millisecond, the interrupt timer times out and the program returns to the timer interrupt service routine at which time the program counter is examined and the routine advances to STEP 2.

In the event that the print flag is set, the program branches at 363b to advance to program step 366 at which time the program counter is set to STEP 4 and the interrupt timer is set to time out after 0.08 milliseconds. This time period is the time period between two adjacent timing pulses and hence immediately after one timing pulse has been counted, the interrupt timer performs an interrupt operation which causes the interrupt service routine to jump to STEP 4 under the control of the present contents of the program counter.

The step 2 routine is shown in FIG. 13 and when the program calls for entry into step 2, at 367 an examination is made to determine whether any line feeds are required. In the event that no line feeds are required, the program branches at 367a to advance to program step 368 which terminates the reverse motor routine (see FIG. 21) in the event that the carriage is in motion but is at the RTP position. Thereafter, the program advances to step 369 which resets the program counter to STEP 1 and sets the interrupt timer for a time out period of 1 millisecond, after which the program returns to the STEP 1 sub-routine in the manner previously described.

In the event that line feeds are required at step 367, the program branches at 367b to step 371 at which time the microprocessor 100 applies a line feed activating signal to the output line P27 of microprocessor 100 which signal is coupled through inverter 33h to the base electrode or transistor Q1 which is turned on to apply current of a sufficient magnitude through common line 19 the emitter of, transistor Q1 and its collector to the line feed solenoid (LF). The STEP 2 routine then advances to stage 372 which causes a jump to the long delay timer which is set to provide a 50 millisecond delay. The long delay timer constitutes the DELAY 355 shown in FIG. 10 which is a dedicated location in RAM 103 capable of providing a long time delay in a manner to be more fully described in conjunction with the DELAY routine shown in detail in FIG. 20.

The STEP 2 sub-routine then advances to step 373 which sets the program counter to step 3 and sets the interrupt timer for 0.08 milliseconds which, as was previously described, is the interval between two adjacent clock pulses. Thereafter, the subroutine returns at 374 to cause the program to jump to step 3 shown as 350 in FIGS. 10 and 14.

FIG. 14 shows the STEP 3 sub-routine which, when entered, advances to step 375 causing the signal on the line feed solenoid port to be terminated. In other words, the line feed signal applied to the line feed mechanism of the printer (a solenoid in the present example) is removed from output terminal P27 of microprocessor 100. The program then advances to step 376 which calls for the long delay timer routine 355 (DELAY) shown in FIGS. 10 and 20 and sets the delay timer for a 60 millisecond delay which is sufficient to allow the line feed actuating mechanism to settle to its quiescent state.

The STEP 3 routine then advances to step 377 which decrements the line feed count by one as a result of having performed a single line feed operation, and sets the interrupt timer for a 1 millisecond interval (equivalent to 12 successive clock pulses). As soon as the interrupt timer times out, the program returns at 378 to the STEP 1 sub-routine.

FIG. 15 shows the STEP 4 sub-routine 351 which, when entered into, advances to step 380 at which time the carriage motor is moved forward, the double-print column flag is initialized and another sub-routine is entered into to insure that no more than eighty-one (81) characters are printed.

The carriage assembly drive motor is driven in the forward direction by the microprocessor 100 which places a signal at its output terminal P11. The double-print column flag is the flag indicative of the fact that elongated characters are being printed whereby a routine is utilized in which each dot column pattern is printed twice to obtain an elongated (i.e. double-width) character format. Since double-width characters are the equivalent of printing two characters, and since the character code for a double-width character is identical to the character code for a single-width characters except for the DB8 bit of the character code, it is possible to load more than eighty (80) character spaces of data into the print buffer portion of the random access memory (RAM) 103. However, it is obvious that only forty (40) elongated characters can be printed in a printer having a maximum of printing eighty (80) characters per line so that this subroutine performs an examination to determine the total number of columns printed in order to assure that the printer does not print more than 810 dot columns (the equivalent of eighty-one (81) standard characters or forty (40) elongated characters), this routine being called upon to terminate printing when forty (40) double-width characters or eighty-one (81) standard characters have been printed and causing the printer to be initialized in readiness for the next line of print in spite of the fact that the character codes representing characters yet to be printed may still remain in the PRINT BUFFER portion of RAM.

Thereafter, the STEP 4 routine advances to step 381 at which time the buffer pointer and column pointers are initialized and the column data from the character generator portion of ROM is called for to place the first print column information in the print column register which is a dedicated location in RAM 103.

The functions performed at step 381 serve to initialize the buffer to reset it in readiness to step from the address location in RAM 103 representing the first character to be printed at the left-hand end of the line of print and sequentially thereafter each successive character. The column pointer is set dependent upon the dot matrix to be printed. For example, in printing dot matrix characters in a seven (7) column by seven (7) row format, the column pointer is appropriately set to assure that the print head will selectively print seven (7) columns for each character. The column register, which is a dedicated position in RAM 103 is initialized and is utilized to develop a binary count representative of each column position. Four binary positions are necessary to be able to represent any binary count from 1 through 10, there being seven (7) dot column positions plus three blank space positions to provide proper spacing between the end of the last character printed and the beginning of the next character to be printed. Thus, a character plus the space between it and the next character occupies ten (10) dot column positions which in the present example has a width of 0.10 inches.

Each binary combination derived from the print column register is utilized, together with the character code, to select the correct dot matrix for that character and the correct dot column pattern within the seven (7) column by seven (7) dot matrix, which is conventional in printers employing character generators. A character generator is a storage device comprised of a suitable number of addressable locations for storing the 7×7 dot column patters of sixty-four (64) characters including alphabetic characters, numeric characters, symbols, punctuation marks and the like. The particular one of the sixty-four (64) dot matrix patterns stored within the character generator is addressed by a character code typically of six binary bits, the code being applied to one set of inputs of the character generator. The particular dot column of the seven (7) dot columns making up the dot pattern is selected by keeping a running count of the column about to be printed, which data is stored in the column register in binary form, and applying this 4-bit binary word to a second set of inputs of the character generator in order to select the proper dot column of the dot pattern called for by the character code applied to the first set of inputs of the character generator. The same operation is obtained within the microprocessor 100 of the present invention simply by utilizing a sufficient number of storage locations in ROM for storing at least one full character set and, in some instances, a plurality of character sets in the event that the printer is adapted to print more than one character set. An example of this would be full upper and lower case character sets of the standard alphabetic characters and a second full upper and lower case character set of italic characters.

Upon completion of the functions performed at step 381, the routine of FIG. 15 jumps to step 382 at which time the program counter is set to the address for STEP 5 in the timer interrupt service routine and the interrupt timer is set to a count of 0.08 milliseconds. Thus, the timer interrupt service routine is reentered immediately after the occurrence of the next clock pulse.

FIG. 16 shows the STEP 5 subroutine of the timer interrupt service routine which is entered into after the return from step 383 of the subroutine of FIG. 15 and the subroutine advances to step 384 to determine whether the carriage has been returned to the RTP position. In the event that it has not, the program branches at 384a to advance to step 385 at which time the column interrupt flag is enabled and the clock interrupt flag is disabled. This permits the column interrupt service routine of FIG. 9 to be entered into and prevents any further entry into the timer interrupt service routines of FIG. 10 until these interrupts are reset.

When this is accomplished, the program advances to step 386 which sets the program counter to STEP 5 and sets the interrupt timer time out after 0.08 milliseconds at which time the program is returned in the timer interrupt service routine.

It should be understood that when the column interrupt is enabled, the column interrupt service routine is entered to perform the steps shown in FIG. 9 which cause the program to jump to STEP 7 as will be more fully described hereinbelow. Similarly, when the carriage assembly is in the RTP switch position, the program branches at 384b which also causes advancement to step 386 for performing the same functions as described hereinabove.

Turning to a consideration of the STEP 7 subroutine (see FIG. 19) entered into from the column interrupt service routine of FIG. 9, when this subroutine is entered into, the program advances to step 393 which determines whether the character being read out of the printer buffer portion of RAM 103 is a carriage return function code. In the event that it is a carriage return function code, this indicates that the entire line has been printed and the program branches at 393a to the END SET routine shown in FIG. 19, which subroutine will be more fully described hereinbelow.

In the event that each character, as it is examined, is a data character, the program branches at 393b to advance to step 394 at which time the column data and the column register is called out and a print strobe time interval of 0.8 milliseconds is set up. The column data is stored in a dedicated position in RAM 103 and is removed from the address position and utilized to determine which address position in memory the dot column pattern for the dot column represented by the binary word in the column register, is to be printed. A print strobe of 0.8 milliseconds duration is developed at selected ones of the outputs P21 through P26 to be applied to the base electrodes of their associated transistors Q2 through Q8 for providing drive current of a sufficient magnitude to selected ones of the print head solenoid windings at SOL1 through SOL7, respectively.

When the print strobe time (0.8 milliseconds) terminates, the print strobe condition is removed from terminals P20-P26, terminating the firing of transistors Q2 through Q8.

The program advances to step 395 at which time the column counter is examined to see if it contains a binary word equal to the decimal count 810. For example, if a full line of eighty-one (81 characters is printed and each character, together with the space between it and the adjacent character, occupies ten (10) column positions then a total number of 810 column positions have been counted by the column register. In the event that the count exceeds 810, the program branches at 395a to advance to the end set ENDSET subroutine shown in FIG. 19.

In the event that the column register count is less than 810, the program branches at 395b to advance to program step 396 in order to determine whether the character next to be printed is an elongated character. In the event that the character is to be an elongated character, the program branches to 396a and advances to step 397 to determine if the column repeat flag is set to logic 1. In the event that the column repeat flag has not been set to logic 1, the program branches at 397a to step 398 at which time the column repeat flag is set to logic 0.

In the event that the column repeat flag is equal to logic 1, the program branches to 397b to advance to step 399 causing the column repeat flag to be cleared, i.e. to be set to logic 0.

Since all of the elongated character codes have had their DB8 bit forced to logic 1, the column repeat flag need not be set to logic 1 and is therefore reset to logic 0 at step 398. In the event that the column repeat flag is set at logic 1, it is likewise cleared at step 399 since all character codes have their DB8 bit already forced to logic 1.

From step 399, the subroutine advances to step 400 at which time the column pointer, which maintains the count of the dot column presently being printed, is advanced by one count. At step 401, the count in the column pointer is examined. If the count is equal to ten (10), the program branches at 401a to step 402 at which time the buffer pointer is reduced by one count in readiness to receive the next character code. The column count is also reset to zero in readiness to print that next character.

In the event that the column count is less then ten (10), the program branches at 401b to advance to step 403 which causes the program to jump to the collect data subroutine which selects the next dot column pattern from the code generator portion of ROM 102 for printing the proper dot column stored at that location. Steps 398 and 403 both advance to step 404 at which time the column interrupts are disabled and the timer interrupts are enabled allowing timer interrupts to again be performed during the dead time between the completion of printing of any dot column pattern and the initiation of printing of the next successive dot column pattern. This is made possible due to the fact that the microprocessor 100 is operating at electronic speeds of the order of fractions of a millisecond while the printer is operating at mechanical speeds which are of the order of tens of milliseconds to hundreds of milliseconds.

Figure 17:
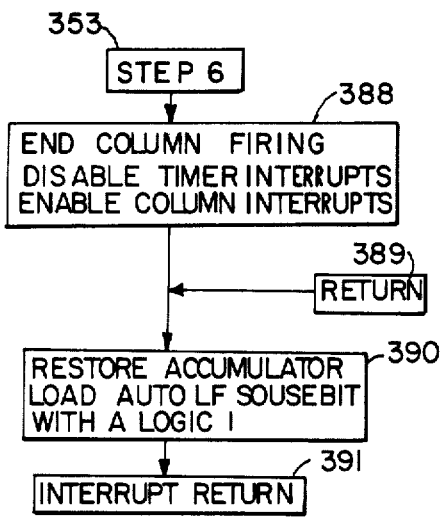

Turning to the sub-routine of STEP 6 shown in FIG. 17, the column firing is terminated, the timer interrupts are disabled, the column interrupts are enabled at 388 and the program then advances to step 390. Column firing is terminated in accordance with the print strobe time interval of 0.80 milliseconds set at program step 394 of FIG. 18. The end of this time interval is recognized at step 388 at which time the program further disables the timer interrupts and enables the column interrupts to perform the reverse functions from those performed at program step 385 shown in FIG. 16.

Advancing to program step 390, the contents of the accumulator previously stored in a dedicated address in RAM 103 is returned to the accumulator 104. The microprocessor 100 then exmines the logic state at its input/output port P15. In order to adapt the microprocessor 100 for performing an automatic fine feed, a resistor R34 is permanently wired between microprocessor terminal P15 and ground reference. The operation of the automatic line feed is such that when a carriage return is performed, the program then looks to the logic level at terminal P15 and, if resistor R34 is present, an automatic line feed operation is performed, thus allowing the data source to eliminate the need for transmitting the line feed code and merely requiring the data source to transmit a carriage return code which, together with the presence of resistor R34, automatically raises a line feed operation.

After the automatic line feed sense bit is set to logic 1, the program returns to the interrupt routine at step 391.

Figure 20:
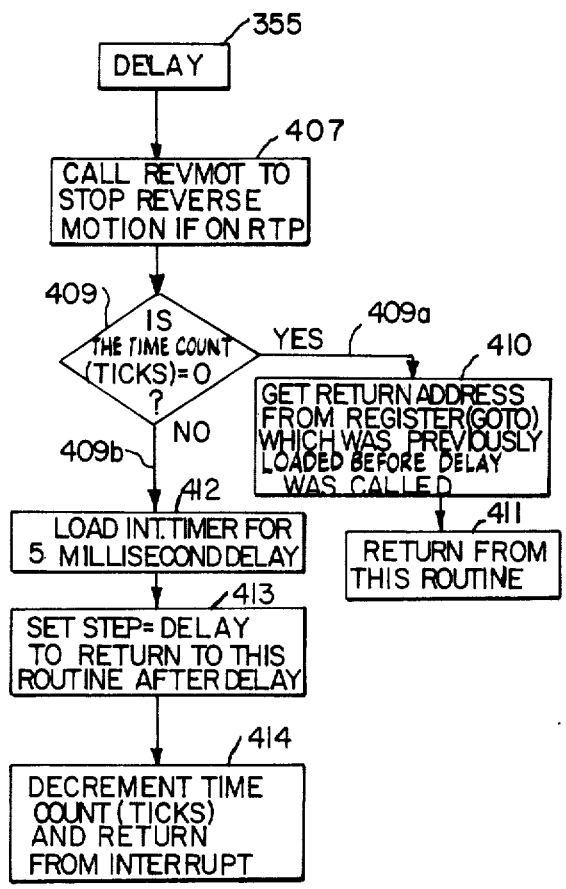

FIG. 20 shows the delay subroutine forming part of the timer interrupt service routine of FIG. 10. Entering into the delay subroutine, the program advances to step 407 which terminates the reverse motor (REVMOT) routine, to stop the movement of the printer carriage if the carriage has reached the RTP position. The program advances to step 409 to determine whether the time count in the interrupt timer has counted down to 0. The interrupt timer comprises a dedicated location in RAM 103 capable of storing at least six (6) binary bits, thereby being adapted to store a maximum count of decimal 63. Given the clock pulse rate of 0.08 milliseconds, a full count of the six (6) bit register is reached after 5 milliseconds. At the time that the count counts down to 0, the program branches at 409a to the dedicated register position for storing long delay conditions whereby each binary count stored in the dedicated register position (GOTO) results from a full countdown in the interrupt timer counter of 5 milliseconds. Thus each count stored in the GOTO register represents a time interval of 5 milliseconds. This technique permits long time delays, for example, of the order of 50 milliseconds, to be obtained. Such a 50 millisecond delay is employed in the STEP 2 sub-routine at stage 372 shown in FIG. 13.

The step 410 thus obtains a return address from the address counter and returns from the routine of FIG. 20 at 411. In the event that the interrupt time counter has not timed down to 0, the program branches at 409b, to advance to step 412 which loads the interrupt timer for a 5 millisecond delay, i.e., which loads the interrupt timer to its maximum capacity. The program then advances to step 413 which causes the address of the delay subroutine 355 to be set in the program counter. Thereafter, the program advances to step 414 at which time the time count in the delay register is decremented by one count nd the program is then returned from the interrupt condition.

Figure 18:
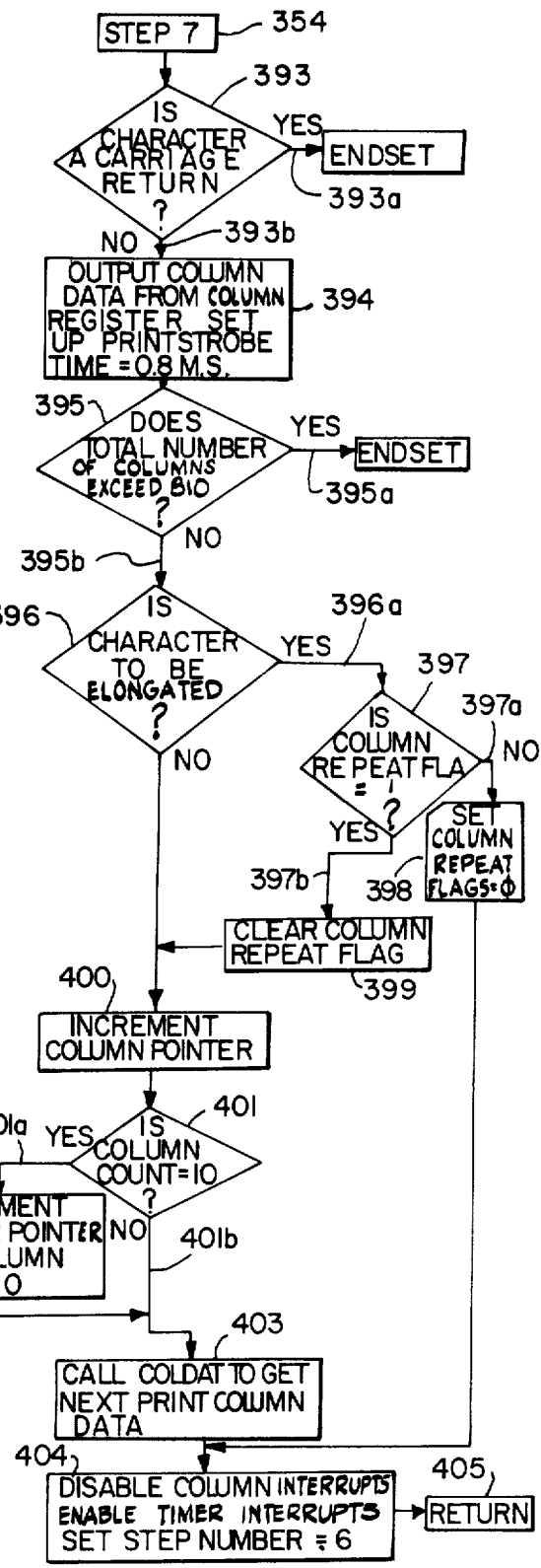

FIG. 19 shows the ENDSET subroutine which is entered into, for example, at step 393a of FIG. 18.

At step 426 the print flag is cleared, the column interrupts are disabled since it is no longer desired to recognize a column interrupt; timer interrupts are enabled to recognize subsequent functions such as, returning the carriage to the RTP position, performing any unprocessed line feed, etc. The motor is stopped since printing has ended for the line last in process.

The program advances to step 427 to test pin P15 of microprocessor 100 for the presence of resistor R34. The presence of resistor R34 invokes an automatic line feed causing the program to branch at 427a to step 428 to increment the line feed count in RAM 103.

In the event that resistor R34 is not provided, the program branches at 427b to step 429 which starts the carriage drive motor in the reverse direction and sets the program counter to STEP 2, after which the program returns from the ENDSET subroutine at 430.

The reverse motor routine is shown in FIG. 21 and is entered into, for example, at step 360 in the step 0 subroutine shown in FIG. 11 wherein when the program subroutine is entered into at 415, the program advances to step 416 at which time the operating condition of the motor is examined to determine if it is running in reverse. In the event that the motor is not running in reverse, the program branches at 416a to advance to step 417 causing a return from a reverse motor (REVMOT) sub-routine. In the event that the motor is running in reverse, the program branches at 416b to advance to step 418 which examines the Hall effect sensor element 29 to determine whether the carriage is in the RTP position. In the event that the carriage is not in the RTP position, the program branches at 418a to cause a return from the reverse motor subroutine. In the event that the carriage is in RTP position, the program branches at 418b advancing to program step 419 which removes the reverse signal from port P12 to stop the motor and thereafter, at program step 420, returns from this subroutine.

FIG. 22 shows the response subroutine which, for example, is entered into at program step 326 in the routine shown in FIG. 6. The program is entered into at step 421 which advances to step 422 to develop a pulse at the microprocessor output P10 for resetting the data strobe flip-flop 23. At step 423, the acknowledge pulse (ACK) is developed at output terminal P14 of the microprocessor 100, whereupon the program advances to step 424 causing the return from this subroutine.

It can be seen from the foregoing description that the present invention provides a highly flexible method and apparatus for controlling the operation of a printer wherein the printer electronics is capable of shifting from data collection and examination routines to printer execution routines at frequent intervals throughout the operation of the printer electronics to take full advantage of the fact that steps being executed by the printer at mechanical speeds are one or two orders of magnitude slower than the operating speed of the microprocessor, enabling a number of functions to be performed during otherwise dead time periods. In addition, the built-in flexibility of the microprocessor allows for simple, straightforward modification without any change in the hard-wired electronics, simply by alteration of the stored program in the Read Only Memory of the microprocessor which is preferably of the programmable Read Only Memory type.

A latitude of modification, change and substitution is intended in the foregoing disclosure and, in some instances, some features of the invention will be employed without a corresponding use of other features. Accordingly, it is appropriate that the appended claims be construed broadly in a manner consistent with the spirit and scope of the invention herein.

What is claimed is:

1. Control means for operating a printer having a printer carriage, paper feed means, carriage drive means and printing means, said control means comprising:
    microprocessor means responsive to data and control codes for controlling printer operations;
    latch means for receiving incoming code words selectively representing data and commands loaded into said latch means by a strobe pulse following each code word;
    means responsive to said strobe pulse for loading each of said code words into said microprocessor means;
    said microprocessor means including memory means for storing character codes;
    examining means for determining the type of code word present, said examining means further including means for generating a buffer full signal when loading the code words into memory means is completed;

sensor means sensing the location of the printer carriage to generate a start signal when the carriage is in the start position;

print initiating means in said microprocessor for initiating printing responsive to said buffer full signal and said start signal;

said printing initiating means including means for setting a predetermined time delay interval and means to reexamine said sensor means in the event that the buffer full signal condition and the start signal are not present at the first examination; and means responsive to the presence of said predetermined time interval for reactivating said examining means.

2. Control means for operating a printer having a printer carriage, carriage driving means, paper feed means and printing means, said control means comprising:

microprocessor means responsive to incoming data and control code information from a remote source for controlling the operation of the printer;

drive circuit means for energizing said printing means, said carriage drive means and said paper feed means;

said microprocessor means including output port means coupled to said drive circuit means for selectively energizing said drive circuit means responsive to controlling signals developed at selected intervals by said microprocessor means;

said microprocessor means comprising initialization means for setting the conditions at said port means to signal levels preventing erroneous operation of the printer until the proper data and control words have been received from the remote source;

power supply means to supply power to said microprocessor means; and clamping means coupled to said drive circuit means and responsive to fluctuations in the output of said power supply means applied to a clamping input of said clamping means for disabling said drive circuit means to prevent erroneous operation of the printer.

3. The control means of claim 2 wherein said clamping means further comprises second input means coupled to one of said microprocessor means output port means for enabling said drive circuit means whenever the signal at the port means coupled thereto is at a predetermined signal level;

said microprocessor means comprising means for applying said predetermined signal level to the output port means coupled to said clamping means to enable the performance of a valid printer operation.

4. A method for operating a microprocessor based control system for a printer having a carriage assembly carriage drive means, paper feed means and printing means coupled to the output ports of the microprocessor through drive circuits, said microprocessor being arranged to receive data and control codes from a remote source for controlling the operation of the printer mechanisms in a predetermined order, said microprocessor comprising assemblies including a data bus; input/output ports; a program counter; a plurality of registers; a memory; and circuitry including logic circuitry for moving signals between and among the subassemblies;

said method comprising the steps of:

preventing any stored data in the microprocessor from erroneously causing printer operations as power is first turned on;

setting the signal levels at said output ports to disabling signal levels to prevent operation of the printer mechanisms before receiving data from the remote source;

generating a demand signal for transmission to the remote source advising that the printer is ready to receive data; and accepting incoming codes from the remote source.

5. The method of claim 4 wherein the step of accepting incoming codes further comprises:

storing the codes in a buffer;

looking for a data strobe pulse from the remove source which pulse follows each code;

transferring the code into a register in the microprocessor upon receipt of the data strobe pulse;

examining the code to determine if it is a control code or a data code;

loading codes into successive predetermined memory locations in the microprocessor memory;

counting the number of data codes loaded into memory; and signalling the remote source when the data codes loaded into memory have reached a capacity count.

6. The method of claim 5 further comprising the steps of:

inserting a carriage return code into memory when the capacity count is reached;

examining memory for the count representing unprocessed line feed operations; and repetitively examining said count and preventing the advancement to the next operation until the count has been reduced to zero.

7. The method of claim 6 further comprising the steps of:

initiating a first delay of a predetermined time interval after generation of said demand signal;

terminating the examination of the line feed count in memory and performing a line feed operation at the end of said time interval;

reducing the line feed count in memory by one count; and initiating a second time delay of a second predetermined time interval and returning to an examination of the line feed count in memory at the end of said second delay interval.

8. The method of claim 7 further comprising the steps of:

terminating reexamination of said line feed count upon termination of said second time delay and initiating a line, decrementing the line feed count, resetting said second time delay and returning to examination of said line feed count.

9. The method of claim 7, further comprising the steps of examining codes not yet examined during the second delay interval; and terminating examining of such codes when the delay interval is terminated.

10. The method of claim 7 further comprising the steps of:

examining for unattended codes during said first delay and terminating said examination on termination of said first delay.

11. The method of claim 10 further comprising the steps of:
monitoring that one of the drive means, feed means and printing means being operated during the execute sequence to determine if it has completed the operation called for;
reinitiating the delay interval if the operation called for has not been completed; and
returning to the acceptance sequence.

12. The method of claim 4 further comprising the steps of:
developing a signal for initiating movement of the printer carriage to the start position; and
initiating a first time delay.

13. The method of claim 12 further comprising the steps of:
examining the line feed count in memory and performing a line feed operation if the count is greater than zero when said first time delay period has ended; and
initiating a second time delay interval.

14. The method of claim 13 further comprising the steps of:
initiating a signal for moving the carriage drive in the print direction when the second time delay period has ended; and
initiating a third time delay.

15. The method of claim 14 further comprising the steps of:
determining if the carriage has moved from the start position; and
initiating a fourth time delay.

16. The method of claim 15 further comprising the steps of:
sensing the movement of the printer carriage for selectively controlling the printing means if it moves in the print direction across the printer; and
initiating a fifth time delay.

17. The method of claim 16 further comprising the steps of:
examining each code stored in said predetermined locations in memory;
stopping said carriage drive means when the code examined is a carriage return code; and
reversing said carriage drive means to move the carriage to the start position.

18. The method of claim 16 further comprising the steps of:
counting the print positions at which printing has occurred; and
initiating operation of said printing means when said count is less than a predetermined amount.

19. The method of claim 18 further comprising the steps of:
turning off said drive means when said predetermined count is reached.

20. The method of claim 19 further comprising the steps of:
initiating a demand signal advising the remote source controlling the printer that the printer is ready to print a new line; and
actuating the carriage drive means to return the carriage to the start position.

21. The method of claim 12 further comprising the steps of:
examining any other codes which may require attention during the first delay interval; and
terminating the examination of such codes and examining the printer carriage to determine if it has reached the start position upon termination of said first delay interval.

22. The method of claim 21 further comprising the steps of:
reinitiating said first delay interval and repeating the steps of claim 20 and the reinitiation of the first delay interval until the printer carriage has reached the start position.

23. A method for operating a microprocessor based control system for a printer having a carriage assembly, carriage drive means, paper feed means and printing means coupled to the output ports of the microprocessor through drive circuits, said microprocessor being arranged to receive data and control codes from a remote source for controlling the operation of the printer mechanisms in a predetermined order, said microprocessor comprising assemblies including a data bus; input/output ports; a program counter; a plurality of registers; a memory; and circuitry including logic circuitry for moving signals between and among the subassemblies;
said method comprising the steps of:
entering into an acceptance sequence for accepting and storing incoming codes from the remote source;
entering into an execute sequence activating said drive means, feed means and printing means in a predetermined sequence;
initiating a time delay interval simultaneously with the initiation of operation of said drive means, feed means and printing means;
reentering said acceptance sequence during said intervals; and
reentering said execute sequence and the end of said intervals.

* * * * *